United States Patent [19]

Nakamura et al.

[11] Patent Number: 4,601,933

[45] Date of Patent: Jul. 22, 1986

[54] HEAT TRANSFER PROMOTERS AND METHOD OF USING THE SAME

[75] Inventors: Yoshiro Nakamura 2-8-51, Takamatsu; Kunio Mori 4-17-20, Takamatsu, both of Morioka; Minoru Okumura, Hiratsuka; Yoshio Mochida, Ebina; Matsuo Miyazaki, Yokohama, all of Japan

[73] Assignees: Yoshiro Nakamura; Kunio Mori, both of Morioka; Kabushiki Kaisha Toshiba, Kawasaki, all of Japan

[21] Appl. No.: 662,027

[22] Filed: Oct. 18, 1984

[30] Foreign Application Priority Data

Oct. 19, 1983 [JP] Japan .................. 58-195808

[51] Int. Cl.$^4$ .......... F16L 9/02; F28F 19/02; C09K 5/00; B05D 3/04
[52] U.S. Cl. ........................ 428/36; 138/145; 165/133; 252/71; 252/74; 427/307; 427/309
[58] Field of Search ........... 427/388.1, 307, 309; 138/145, 178; 165/133, 60; 252/74, 71; 428/35, 36

[56] References Cited

U.S. PATENT DOCUMENTS

| | | | |
|---|---|---|---|
| 4,193,180 | 3/1980 | Press | 29/157.4 |
| 4,246,057 | 1/1981 | Janowski et al. | 156/150 |
| 4,296,539 | 10/1981 | Asami | 29/157.3 A |
| 4,354,550 | 10/1982 | Modahl et al. | 165/133 |
| 4,358,485 | 11/1982 | Kern et al. | 427/376.8 |
| 4,368,776 | 1/1983 | Negita et al. | 165/133 |
| 4,421,789 | 12/1983 | Kaneko et al. | 427/409 X |

OTHER PUBLICATIONS

L. C. F. Blackman, et al., "An Investigation of Compounds Promoting the Dropwise Condensation of Steam," J. Appl. Chem, Apr. 7, 1957, pp. 161–171.

L. A. Bromley, et al., "Promotion of Drop-By-Drop Condensation of Steam from Seawater on a Vertical Copper Tube", AIChE Journal, vol. 14, No. 2, Mar. 1968, pp. 245–250.

Chemical Abstracts, 101 (4) 25,156x (1984).

Chemical Abstracts, 92 (20) 165,376q (1980).

Primary Examiner—Thurman K. Page
Attorney, Agent, or Firm—Schwartz, Jeffery, Schwaab, Mack, Blumenthal & Evans

[57] ABSTRACT

A heat transfer promoter composition comprises a triazine-dithiol derivative represented by the general formula

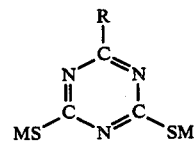

wherein R represents —NHR' or —NR'$_2$ wherein: R' is a hydrocarbon group; M is selected from the group consisting of hydrogen, alkali metals, and alkaline earth metals; and at least one of M groups is alkaline metal or alkaline earth metal. This heat transfer promotor is applied to that surface of a condenser tube to be contacted by a vapor to be condensed.

15 Claims, 2 Drawing Figures

HEAT TRANSFER PROMOTERS AND METHOD OF USING THE SAME

BACKGROUND OF THE INVENTION

This invention relates to heat transfer promoters and methods for using the same, and more particularly to heat transfer promoters for improving the heat transfer performance of heat transfer tubes used in vapor-liquid condensation systems and a method of using the same.

In recent years, a variety of studies have been carried out in order to improve the performance of heat exchangers from the standpoints of saving energy and saving resources.

In general, in a heat exchanger of vapor-liquid condensation systems such as the steam condenser of a steam turbine plant and the condenser of a refrigerator, the condensation performance depends largely upon the heat transfer performance of the heat transfer tubes used in the heat exchanger. Therefore the improvement of heat transfer performance is extremely important. For example, if the heat transfer performance of the heat transfer tubes used in a surface steam condenser of a steam turbine plant is inferior, the condensation performance and degree of vacuum of the condenser will be reduced. The thermal efficiency of the whole plant will therefore also be reduced.

In general, in order to improve the cooling performance of the condenser, a method wherein the heat transfer area of the heat transfer tubes is increased and another method wherein the flow state of cooling water fed to the condenser is increased have been proposed. However, the use of heat transfer tubes having a long length or the use of heat transfer tubes provided with fins which increase the heat transfer area leads to complication of the structure and increase in cost.

Further, if the flow rate of the cooling water circulated through the condenser is increased, the pressure loss of the cooling water significantly increases (the pressure loss is proportional to square of the flow rate). Therefore not only does the power expenditure of the pump increase, but also the corrosion rate of the heat transfer tubes increases with increasing flow rate.

Other effective methods for improving the heat transfer performance of the heat transfer tubes include a method wherein the condensation at the surface of the heat transfer tube is caused to be a dropwise condensation.

In general, when steam is brought into contact with a heating surface having a lower temperature than saturation temperature of the steam, the condensation mechanism is a filmwise condensation or a dropwise condensation. In the filmwise condensation, the condensate covers the surface of each heat transfer tube in the form of a film and flows downward, and the released condensation latent heat is transmitted to the heat transfer tube through the condensate film. In the dropwise condensation, steam condenses at the surface of each heat transfer tube in the form of drops and flows downward.

It is known that the dropwise condensation exhibits extremely good heat transfer characteristics because there is no heat transfer resistance due to the condensate film formed on the surface of the heat transfer tube as in the case of the filmwise condensation. For example, the coefficient of overall heat transmission during dropwise condensation is far greater, 10 times or more, than that during filmwise condensation.

At the surface of each metal heat transfer tube, filmwise condensation usually occurs. Therefore, the conversion of this to dropwise condensation is extremely effective for improving heat transfer performance and is a fascinating subject. Heretofore, many studies on promoters for promoting dropwise condensation have been carried out. However, promoters capable of being applied to actual condensers have not yet been developed.

For example, promoters for copper or copper alloy cooling tubes include octyl thiocyanate, benzyl mercaptan, and the like. It has been known that dropwise condensation occurs by treating the surface of each tube with these materials. However, the bonding power between these materials and metal is weak, and therefore the materials readily peel off from the surface of the tube.

Further, dropwise condensation can be promoted by coating the surface of each heat transfer tube with film of materials having good water repellency such as tetrafluoroethylene resin (TEFLON). However, in this case, heat transfer resistance is increased by virtue of the TEFLON film.

SUMMARY OF THE INVENTION

In view of the difficulties of the prior art as described above, we have carried out studies directed toward overcoming them.

It is an object of the present invention to provide a heat transfer promoter which has excellent durability, exhibits good dropwise condensation, and can be strongly bonded to the surface of a heat transfer tube.

It is another object of the present invention to provide a method of using a heat transfer promoter.

We have carried out extensive studies in order to obtain a heat transfer promoter having good water repellency, excellent chemical stability, and safety features, which is strongly attached to a metal surface and thus cannot readily peel off. As a result, we have found that a specific triazinedithiol derivative has extremely excellent heat transfer promotion characteristics.

More specifically, a heat transfer promoter of the present invention is characterized in that it contains a triazine-dithiol derivative represented by the general formula:

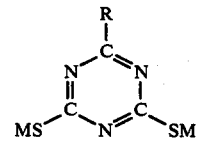

wherein R represents —NHR' or —NR$_2$', wherein: R' is a hydrocarbon group; M is selected from hydrogen, alkali metals, and alkaline earth metals; and at least one of M groups is an alkali metal or alkaline earth metal.

Further, the method of promoting heat transfer in a heat transfer tube of the present invention comprises the step of treating the surface of a heat transfer tube with the above described heat transfer promoter according to this invention. The tube according to the invention is used in a vapor-liquid condensation system. Gas to be condensed is brought into contact with the tube.

BRIEF DESCRIPTION OF THE DRAWING

In the accompanying drawing

DETAILED DESCRIPTION OF THE INVENTION

Heat transfer promoter

Figure 1:
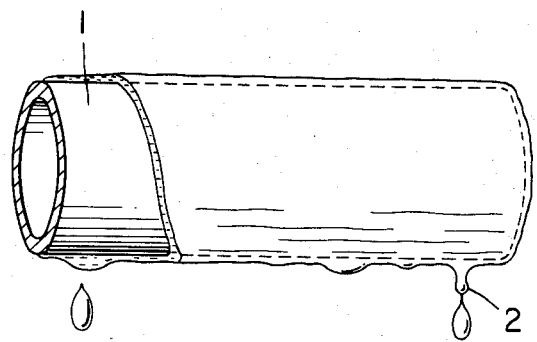
FIGS. 1 and 2 are partial perspective views respectively showing the state of condensation of a vapor on the surface of condenser tubes which have not and which have, respectively, been treated with the heat transfer promoter of this invention.

A heat transfer promoter of the present invention contains, as an effective component, a triazinedithiol derivative represented by the general formula:

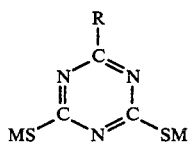

In the above formula, R represents —NHR' or —NR$_2$' wherein R' is a hydrocarbon group, preferably a hydrocarbon group containing at least 4 carbon atoms, and more particularly a hydrocarbon group containing from 4 to 18 carbon atoms. For example, besides aliphatic saturated hydrocarbon groups such as an octyl group and a dodecyl group, R' may be an aliphatic unsaturated hydrocarbon group such as an oleyl group.

Further, R' may be an aromatic hydrocarbon group containing at least 7 carbon atoms such as a methyl benzyl group or a nitrogen-containing hydrocarbon group such as an aminophenyl group. Further, M is selected from hydrogen, an alkali metal, and an alkaline earth metal. At least one of the M groups is an alkali metal or an alkaline earth metal, preferably Li, Na, K, ½Mg, ½Ca or ½Ba.

Examples of the above triazine-dithiol derivative which is a component of the heat transfer promoter of the present invention are monosodium 2-butylamino-4,6-dimercapto-S-triazine, monosodium 2-oleylamino-4,6-dimercapto-S-triazine, monosodium 2-didecylamino-4,6-dimercapto-S-triazine, and monosodium 2-didodecylamino-4,6-dimercapto-S- triazine.

The triazine-dithiol derivative of the present invention has the following excellent properties.

(a) It can be bonded firmly to the metal surface to exhibit good water repellency. That is, the contact angle of liquids such as water at the metal surface is increased, whereby good dropwise condensation develops.

(b) It strongly bonds with metal and cannot be readily peeled off by streams of fluids such as steam. Accordingly, it has excellent durability and is capable of withstanding long-term service. The reason why the heat transfer promoter of the present invention has excellent durability is not yet clearly apparent. It is believed that this is because the release of the heat transfer promoter from the metal surface does not readily occur. Treating the metal surface with the heat transfer promoter is believed to form a chemical bond or a relatively strong bond equal to a chemical bond between the metal and the heat transfer promoter.

(c) It has excellent chemical stability and safety, is easily handled, and is inexpensive. More specifically, alkali metal or alkaline earth metal salts of the triazine-dithiol derivative described above are soluble in water and stable against an oxidizing agent. Further, such salts are colorless and odorless, and their toxicity is extremely low. Furthermore, the triazine-dithiol derivative of the present invention can be used with complete stability under the temperature conditions of conventional steam condensers or of condensers operating at room temperature to 200° C. or more.

The heat transfer promoter of the present invention may contain a mixture of a plurality of triazine-dithiol derivatives and also can contain optional components such as solvents and corrosion inhibitors.

Process for producing triazine-dithiol derivatives

The triazine-dithiol derivative which is the effective component of the heat transfer promoter of the present invention, for example, can be synthesized as follows.

Cyanuric chloride is reacted with amines (R -H) at a low temperature to first form 2-R-4,6-dichloro-1,3,5-triazine, and then NaHS is reacted with this chloride in an organic solvent to obtain 2-R-1,3,5-triazine-4,6-dithiol. This dithiol is then reacted with a desired alkali metal or alkaline earth metal hydroxide to substitute 4-position or 6-position hydrogen with the above metal. Thus, the triazine-dithiol derivative can be synthesized. A process for producing a triazine-dithiol derivative is described, for example, in J. Polymer Sci. Vol. 16, 2055-2062 (1978).

Method for using the heat transfer promoter

The treatment of a heat transfer tube with the heat transfer promoter is carried out by contacting the outer surface of the heat transfer tube with an aqueous solution of the triazine-dithiol derivative described above. For example, the heat transfer tube can be treated by immersing it in the above aqueous solution, or by applying the above aqueous solution to the surface of the heat transfer tube.

It is sufficient to carry out the above described treatment to a degree such that a film of a unimolecular layer of the triazine-dithiol derivative is formed on the surface of the heat transfer tube.

Further, it is preferable to carry out removal of oxide film by a degreasing treatment and pickling according to conventional methods prior to the above treatment with the heat transfer promoter.

Uses

The heat transfer promoter of the present invention can be widely used for heat transfer tubes of heat exchangers which are employed in vapor-liquid condensation systems such as steam condensers of steam turbine plants and condensers of refrigerators. Further, in recent years, titanium tubes have been largely utilized as heat transfer tubes for condensers of freon turbines in marine temperature difference electricity-generating plants.

The heat transfer promoter of the present invention can be also applied to such titanium tubes, whereby an excellent heat transfer promotion effect can be obtained.

In order to indicate more fully the nature and utility of this invention, the following specific examples of practice thereof are set forth, it being understood that these examples are presented as illustrative only and are not intended to limit the scope of the invention.

EXAMPLE 1

A triazine-dithiol derivative was synthesized as follows.

First, amines (R-H, 0.105 mole) were added dropwise to 300 ml of an acetone solution containing cyanuric chloride (18.4 grams, 0.1 mole) over 30 to 60 minutes at a temperature of from $-5°$ to $0°$ C. After completion of this addition, 100 ml of an aqueous solution of $Na_2CO_3$ (5.3 grams) was again added dropwise over 30 to 60 minutes at a temperature of from $-5°$ to $0°$ C. After the temperature was raised to $10°$ C., the mixture was stirred for 120 minutes and charged into a large amount of water. Thus, 2-R-4,6-dichloro-1,3,5-triazine was obtained in the form of a white powder or oil and in quantitative yield.

The dichloride (0.1 mole) was dissolved or dispersed in 300 ml of an organic solvent (such as methanol, tetrahydrofuran, or dimethylformamide). The temperature of the mixture was raised to $40°-50°$ C., and thereafter an aqueous solution (100 ml) of NaHS (0.3 mole) was added dropwise. Each reaction solution was collected and added to a large amount of water. The reaction is complete if the mixture becomes clear. When 0.1N HCl was added to this reaction solution, 2-R-1,3,5-triazine-4,6-dithiol was obtained in a yield of 90% or more.

The above dithiol (0.1 mole) and NaOH (0.1 mole) were dissolved in 200 ml of methanol. Methanol was distilled off to obtain a triazinedithiol derivative represented by the following formula:

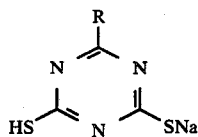

EXAMPLE 2

In order to evaluate the water repellency of the heat transfer promoter obtained in Example 1, the contact angle of water at the metal surface treated with the heat transfer promoter was measured.

Triazine-dithiol derivatives shown in the following Table 1 and benztriazole (reference) were prepared, and in each case, each aqueous solution having a concentration of $10^{-3}$ moles/liter and a temperature of $80°$ C. was prepared. A copper plate was then immersed in each aqueous solution for 30 minutes. For each copper plate thus treated with the heat transfer promoter, the contact angle of water at the surface of the copper plate was measured. The contact angle was determined at a temperature of $20°$ C. using an Elmagoniometer-type contact angle measuring apparatus. Average values of ten measurements in each case are shown in the following Table 1.

TABLE 1

| Heat Transfer Promoter | Contact Angle (degree) |
| --- | --- |
| Monosodium 2-butylamino-4,6-dimercapto-S-triazine | 60.9 |
| Monosodium 2-phenylamino-4,6-dimercapto-S-triazine | 66.2 |
| Monosodium 2-octylamino-4,6-dimercapto-S-triazine | 80.5 |
| Monosodium 2-dioctylamino-4,6-dimercapto-S-triazine | 90.6 |
| Monosodium 2-didodecylamino-4,6-dimercapto-S-triazine | 112.1 |
| Monosodium 2-oleylamino-4,6-dimercapto-S-triazine | 113.7 |
| Benztriazole | 42.3 |

As can be seen from the results described above, the degree of wetting of a copper plate treated with the heat transfer promoter of the present invention is low, and therefore the plate exhibits excellent water repellency.

EXAMPLE 3

In order to evaluate the bonding property between each heat transfer promoter and a metal, an abrasion test of the metal surface treated with the heat transfer promoter was carried out.

For each heat transfer promoter shown in the following Table 2, an aqueous solution having a concentration of $10^{-3}$ moles/liter and a temperature of $80°$ C. was prepared in the same manner as described in Example 1. For each copper plate immersed in each aqueous solution for 30 minutes, an abrasion test was carried out. The time when the heat transfer promoter at the surface of the copper plate was removed by abrasion to expose the metal surface (durability time) was determined. The abrasion test was carried out under the conditions of a load of 50 grams and a sliding velocity of 5 centimeters per minute with the use of a pin disc-type abrasion tester. The results are shown in the following Table 2.

TABLE 2

| Heat Transfer Promoter | Durability Time (minute) |
| --- | --- |
| Monosodium 2-butylamino-4,6-dimercapto-S-triazine | 16 |
| Monosodium 2-phenylamino-4,6-dimercapto-S-triazine | 43 |
| Monosodium 2-octylamino-4,6-dimercapto-S-triazine | 200 |
| Monosodium 2-dioctylamino-4,6-dimercapto-S-triazine | 430 |
| Monosodium 2-didodecylamino-4,6-dimercapto-S-triazine | 500 |
| Monosodium 2-oleylamino-4,6-dimercapto-S-triazine | 450 |
| Benztriazole | 33 |

As can be seen from the results of the abrasion test described above, the heat transfer promoters of the present invention, particularly monosodium 2-octylamino-4,6-dimercapto-S-triazine, monosodium 2-dioctylamino-4,6-dimercapto-S-triazine, monosodium 2-didodecylamino-4,6-dimercapto-S-triazine, monosodium 2-oleylamino-4,6-dimercapto-S-triazine exhibit a long durability time. Accordingly, when they were applied to an actual condenser, they afford excellent resistance to attack by streams of vapor or condensate streams.

EXAMPLE 4

In order to confirm the heat transfer promotion effect by dropwise condensation, measurement of the coefficient of overall heat transmission was carried out by using an aluminum brass tube as a cooling tube of a steam condenser of a steam turbine electricity-generating plant.

First, aqueous solutions of triazine-dithiol derivatives shown in the following Table 3 ($10^{-3}$ moles/liter, 80° C.) were prepared, and aluminum brass tubes were immersed in these aqueous solutions for 30 minutes. Thereafter, the coefficient of overall heat transmission of each tube was measured. Each measurement was carried out under a condition wherein saturated steam at 100° C. was brought into contact with the outer surface of the tube while cooling water (industrial water) was passed through the interior of the tube at a flow velocity of 2 meters per second. For comparison, similar measurements were made also in the case where the tubes which were not treated with the heat transfer promoter. The results are shown in the following Table 3.

The figures in the attached drawing show the condensation state of steam at tube surfaces during measurements of coefficients of overall heat transmission.

FIG. 1 shows the condensation state in the case of a tube which has not been treated with the heat transfer promoter. The overall surface of the heat transfer tube 1 was covered with condensate 2 in the form of film.

Figure 2:
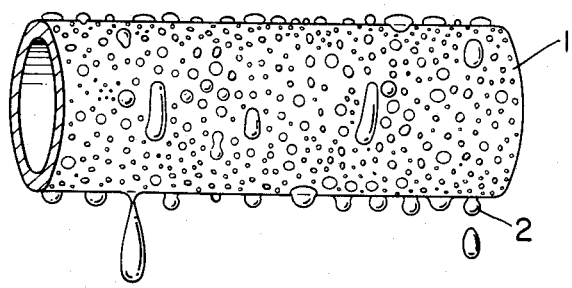

On the other hand, FIG. 2 represents the condensation state in the case of a tube treated with monosodium 2-didecylamino-4,6-dimercapto-S-triazine as the heat transfer promoter, in which it was observed that good dropwise condensation occurred.

TABLE 3

| Heat Transfer Promoter | Coefficient of Heat Transmission (Kcal/m²h° C.) |
| --- | --- |
| Untreated | 3,560 |
| Monosodium 2-butylamino-4,6-dimercapto-S-triazine | 4,710 |
| Monosodium 2-oleylamino-4,6-dimercapto-S-triazine | 5,250 |
| Monosodium 2-didecylamino-4,6-dimercapto-S-triazine | 5,370 |
| Monosodium 2-didodecylamino-4,6-dimercapto-S-triazine | 5,380 |

EXAMPLE 5

In order to confirm the heat transfer promotion effect by dropwise condensation, the coefficient of overall heat transmission was measured using a titanium tube used as a cooling tube of a condenser of a marine temperature difference electricity-generating plant.

Aqueous solutions of triazine-dithiol derivatives shown in the following Table 4 ($10^{-3}$ moles/liter, 80° C.) were prepared, and the titanium tubes were each immersed in the aqueous solutions described above for 30 minutes. Thereafter, the coefficient of overall heat transmission of each tube was measured. The measurement was carried out under a condition wherein freon vapor at 30° C. was brought into contact with the outer surface of the tube while cooling water (industrial water) was passed through the interior of the tube at a flow velocity of 2 meters per second. For comparison, similar measurements were made also in the case of tubes which were not treated with the heat transfer promoter. The results are shown in the following Table 4.

For all of the titanium tubes treated with the heat transfer promoter of the present invention, good dropwise condensation was observed.

TABLE 4

| Heat Transfer Promoter | Coefficient of Heat Transmission (Kcal/m²h° C.) |
| --- | --- |
| Untreated | 1,830 |
| Monosodium 2-butylamino-4,6-dimercapto-S-triazine | 3,640 |
| Monosodium 2-oleylamino-4,6-dimercapto-S-triazine | 4,500 |
| Monosodium 2-didodecylamino-4,6-dimercapto-S-triazine | 4,500 |

As can be seen from the results of the Examples described above, the heat transfer promoter of the present invention can significantly improve the heat transfer coefficient of heat transfer tubes of the heat exchanger of the vapor-liquid condensation system by treating the surface of the heat transfer tubes with this heat transfer promoter. This improvement is due to the triazine-dithiol derivative contained in the promoter which is strongly bonded to the surface of the heat transfer tube to give rise to good dropwise condensation over a long period of time.

Further, according to the heat transfer promoter of the present invention, heat transfer performance and condensation performance of steam condensers, condensers and the like can be readily improved at low cost.

What is claimed is:

1. A method of promoting the heat transfer of a heat transfer tube used in a vapor-liquid condensation system which comprises the step of treating a gas-condensing surface of the heat transfer tube with a heat transfer promoter containing a triazine-dithiol derivative represented by the general formula

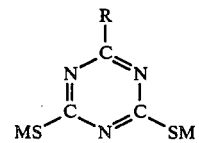

wherein R represents —NHR' or —NR$_2$' wherein: R' is a hydrocarbon group; M is selected from hydrogen, alkali metals, and alkaline earth metals; and at least one of M groups is an alkali metal or alkaline earth metal.

2. A method according to claim 1 wherein said R' is a hydrocarbon group containing from 4 to 18 carbon atoms.

3. A method according to claim 1 wherein said R' is a butyl group, oleyl group, decyl group, octyl group or dodecyl group.

4. A method according to claim 1 wherein said M is H, Li, Na, K, ½Mg, ½Ca or ½Ba.

5. A method according to claim 1, further comprising, before said step of treating, the step of removing an oxide film from the gas-condensing surface of the heat transfer tube.

6. A method according to claim 1, wherein said step of treating comprises immersing said tube for 30 minutes in a $10^{31\ 3}$M solution of said triazine-dithiol derivative.

7. A heat transfer device, comprising a metallic heat transfer tube having a gas-condensing surface and having on said surface a heat transfer promoter comprising a triazine-dithiol derivative represented by the general formula

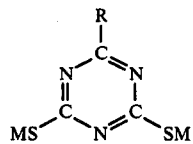

wherein R represent —NHR' or —NR$_2$' wherein: R' is a hydrocarbon group; M is selected from hydrogen, alkali metals, and alkaline earth metals; and at least one of M groups is an alkali metal or alkaline earth metal.

8. A heat transfer device according to claim 7, wherein said R' is a hydrocarbon group containing from 4 to 18 carbon atoms.

9. A heat transfer device according to claim 7, wherein said R' is a butyl group, oleyl group, decyl group, octyl group or dodecyl group.

10. A heat transfer device according to claim 7, wherein said M is H, Li, Na, K, ½ Mg, ½ Ca or ½ Ba.

11. A heat transfer device including a heat transfer tube having a gas-condensing surface produced by a process comprising the step of treating the surface with a heat transfer promoter containing a triazine-dithiol derivative represented by the general formula wherein R represents —NHR' or —NR$_2$' wherein: R' is a hydrocarbon group; M is selected from hydrogen, alkali metals, and alkaline earth metals; and at least one of M groups is an alkali metal or alkaline earth metal.

12. A heat transfer device according to claim 11, wherein said R' is a butyl group, oleyl group, decyl group, octyl group or dodecyl group.

13. A heat transfer device according to claim 11, wherein said M is H, Li, Na, K, ½ Mg, ½ Ca or ½ Ba.

14. A heat transfer device according to claim 11, wherein the process further comprises, before said step of treating, the step of removing an oxide film from the gas-condensing surface of the heat transfer tube.

15. A heat transfer device according to claim 11, wherein said step of treating comprises immersing said tube for 30 minutes in a $10^{-3}$M solution of said triazine-dithiol derivative.

* * * * *